United States Patent
Song et al.

(10) Patent No.: US 12,226,985 B2
(45) Date of Patent: Feb. 18, 2025

(54) SUPPORTING BACK FILM AND MANUFACTURING METHOD THEREFOR, AND FLEXIBLE DISPLAY DEVICE

(71) Applicants: Chengdu BOE Optoelectronics Technology Co., Ltd., Sichuan (CN); BOE Technology Group Co., Ltd., Beijing (CN)

(72) Inventors: Huiqiang Song, Beijing (CN); Lei Yang, Beijing (CN); Fengping Wu, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 235 days.

(21) Appl. No.: 17/802,964

(22) PCT Filed: Nov. 17, 2021

(86) PCT No.: PCT/CN2021/131320
§ 371 (c)(1),
(2) Date: Aug. 29, 2022

(87) PCT Pub. No.: WO2022/156334
PCT Pub. Date: Jul. 28, 2022

(65) Prior Publication Data
US 2023/0094074 A1    Mar. 30, 2023

(30) Foreign Application Priority Data
Jan. 22, 2021   (CN) .......................... 202110087536.1

(51) Int. Cl.
*B32B 3/02*   (2006.01)
*B32B 3/26*   (2006.01)
(Continued)

(52) U.S. Cl.
CPC ............ *B32B 27/365* (2013.01); *B32B 3/266* (2013.01); *B32B 15/082* (2013.01); *B32B 15/09* (2013.01);
(Continued)

(58) Field of Classification Search
CPC ...... B32B 3/266; B32B 2457/20; H01K 5/028
See application file for complete search history.

(56) References Cited

U.S. PATENT DOCUMENTS 9,983,424 B2   5/2018   Kim et al.
10,345,858 B2   7/2019   Han et al.
(Continued)

FOREIGN PATENT DOCUMENTS

CN   106252378 A   12/2016
CN   106486010 A   3/2017
(Continued)

OTHER PUBLICATIONS

International Search Report and Written Opinion mailed on Jan. 26, 2022, in corresponding PCT/CN2021/131320, 9 pages.
(Continued)

*Primary Examiner* — Elizabeth E Mulvaney
(74) *Attorney, Agent, or Firm* — XSENSUS LLP

(57) ABSTRACT

A supporting back film includes a first supporting structure and a second supporting structure arranged on at least one side of the first supporting structure in a second direction. The second direction intersects with the first direction. An orthographic projection of the first supporting structure on the flexible display panel covers the bendable region, and the first supporting structure is bendable. The volume of the second supporting structure is greater than or equal to the volume of the first supporting structure, and the density of the second supporting structure is less than the density of the first supporting structure. Alternatively, the volume of the
(Continued)

first supporting structure is greater than or equal to the volume of the second supporting structure, and the density of the first supporting structure is less than the density of the second supporting structure.

18 Claims, 4 Drawing Sheets

(51) Int. Cl.
    *B32B 15/082* (2006.01)
    *B32B 15/09* (2006.01)
    *B32B 15/18* (2006.01)
    *B32B 27/30* (2006.01)
    *B32B 27/36* (2006.01)
    *G06F 1/16* (2006.01)

(52) U.S. Cl.
    CPC ............ *B32B 15/18* (2013.01); *B32B 27/308* (2013.01); *B32B 2307/7376* (2023.05); *B32B 2311/30* (2013.01); *B32B 2333/12* (2013.01); *B32B 2457/20* (2013.01); *G06F 1/1652* (2013.01)

(56) References Cited

U.S. PATENT DOCUMENTS

| | | | |
|---|---|---|---|
| 10,921,856 | B2 | 2/2021 | Han et al. |
| 11,084,250 | B2 | 8/2021 | Jung et al. |
| 2016/0357052 | A1 | 12/2016 | Kim et al. |
| 2017/0060188 | A1 | 3/2017 | Han et al. |
| 2019/0061318 | A1 | 2/2019 | Jung et al. |
| 2019/0259310 | A1 | 8/2019 | Ha et al. |
| 2019/0265758 | A1 | 8/2019 | Han et al. |
| 2021/0141419 | A1* | 5/2021 | Wang ...................... G06F 1/203 |

FOREIGN PATENT DOCUMENTS

| | | | |
|---|---|---|---|
| CN | 106652802 | A | 5/2017 |
| CN | 107305906 | A | 10/2017 |
| CN | 107331795 | A | 11/2017 |
| CN | 108922981 | A | 11/2018 |
| CN | 109032412 | A | 12/2018 |
| CN | 109630842 | A | 4/2019 |
| CN | 110289271 | A | 9/2019 |
| CN | 110544431 | A | 12/2019 |
| CN | 110689813 | A | 1/2020 |
| CN | 110767096 | A | 2/2020 |
| CN | 110792905 | A | 2/2020 |
| CN | 110796955 | A | 2/2020 |
| CN | 106652802 | B | 3/2020 |
| CN | 111477107 | A | 7/2020 |
| CN | 111986578 | A | 11/2020 |
| CN | 212302934 | U | 1/2021 |
| CN | 112863355 | A | 5/2021 |
| EP | 3404517 | A1 | 11/2018 |
| KR | 2020-0047885 | A | 5/2020 |
| WO | 2020/226209 | A1 | 11/2020 |

OTHER PUBLICATIONS

Office Action issued on Apr. 2, 2022, in corresponding Chinese patent Application No. 202110087536.1, 25 pages.

Notice of Allowance issued on Aug. 25, 2022, in corresponding Chinese patent Application No. 202110087536.1, 7 pages.

* cited by examiner

SUPPORTING BACK FILM AND MANUFACTURING METHOD THEREFOR, AND FLEXIBLE DISPLAY DEVICE

CROSS-REFERENCE TO RELATED APPLICATIONS

The present disclosure is a National Stage of International Application No. PCT/CN2021/131320 filed on Nov. 17, 2021, which claims priority to Chinese Patent Application No. 202110087536.1 entitled "Supporting back film and manufacturing method therefor, and flexible display device", filed on Jan. 22, 2021, and both the entire contents of which are incorporated herein by reference.

TECHNICAL FIELD

The present disclosure relates to the field of display technology, and in particular, to a supporting back film and a manufacturing method for the supporting back film, and a flexible display device.

BACKGROUND

With the development of display technology, flexible display panels such as foldable, stretchable and curlable, have gradually entered the attention of consumers. In order to facilitate bending or recovery of the flexible display panel, it is necessary to make the flexible display panel lighter and thinner. However, as the flexible display panel becomes thinner and lighter, the overall bending resistance and impact resistance are poor.

SUMMARY

An object of the present disclosure is to provide a supporting back film, a manufacturing method therefor, and a flexible display device, thereby at least to a certain extent overcoming one or more problems caused by limitations and defects of the related art.

According to a first aspect of the present disclosure, there is provided a supporting back film provided on a back side of a flexible display panel, where, the flexible display panel is provided with a bendable area, and a bending axis corresponding to the bendable area extends in a first direction, where:

the supporting back film includes a first supporting structure and a second supporting structure provided on at least one side of the first supporting structure in a second direction; the second direction intersects with the first direction; an orthographic projection of the first supporting structure on the flexible display panel covers the bendable area, and the first supporting structure is bendable; where, a volume of the second supporting structure is greater than or equal to a volume of the first supporting structure, and a density of the second supporting structure is less than a density of the first supporting structure; or a volume of the first supporting structure is greater than or equal to a volume of the second supporting structure, and a density of the first supporting structure is less than a density of the second supporting structure.

In some embodiments of the present disclosure, the second supporting structure is provided on opposite sides of the first supporting structure in the second direction, and the second direction is perpendicular to the first direction;

where, the volume of the second supporting structure is greater than the volume of the first supporting structure, and the density of the second supporting structure is less than the density of the first supporting structure.

In some embodiments of the present disclosure, a stiffness of the second supporting structure is greater than or equal to a stiffness of the first supporting structure.

In some embodiments of the present disclosure, the first supporting structure includes a main body part and a plug-in part located on opposite sides of the main body part in the second direction; an orthographic projection of the main body part on the flexible display panel covers the bendable region; the plug-in part includes at least one plug-in block, and the plug-in block is fitted in the second supporting structure.

In some embodiments of the present disclosure, the main body part is provided with a hollow pattern area and a non-pattern area located on opposite sides of the hollow pattern area in the second direction, and an orthographic projection of the hollow pattern area on the flexible display panel covers the bendable region.

In some embodiments of the present disclosure, a dimension of the hollow pattern area in the second direction is A, a dimension of the main body part in the second direction is B, and a bending radius corresponding to the bendable area of the flexible display panel is R;

where, $A-2\times\pi\times R=P$, and $B-A=Q$; a value range of P is 10 mm to 20 mm, and a value range of Q is 5 mm to 10 mm.

In some embodiments of the present disclosure, a dimension of the plug-in block in the second direction is C, where a ratio of C to A is 1 to 2.

In some embodiments of the present disclosure, a ratio of a thickness of the plug-in block to a thickness of the main body part is greater than or equal to 0.5 and less than 1.

In some embodiments of the present disclosure, a side of the first supporting structure close to the flexible display panel is a top side, and a side away from the flexible display panel is a bottom side;

where, a distance between a top side of the plug-in block and a top side of the main body part is equal to a distance between a bottom side of the plug-in block and a bottom side of the main body part.

In some embodiments of the present disclosure, the plug-in part includes one plug-in block, and opposite sides of the plug-in block in the first direction are flush with opposite sides of the main body part in the first direction respectively; or the plug-in part includes a plurality of plug-in blocks arranged at intervals in the first direction.

In some embodiments of the present disclosure, the thickness of the main body part is 100 μm to 200 μm.

In some embodiments of the present disclosure, a material of the first supporting structure includes a metal material, and a material of the second supporting structure includes a high molecular polymer material.

In some embodiments of the present disclosure, the metal material includes stainless steel, and the high molecular polymer material includes polycarbonate or polymethyl methacrylate.

According to a second aspect of the present disclosure, there is provided a flexible display device, including:

a flexible display panel, where the flexible display panel is provided with a bendable area, and a bending axis corresponding to the bendable area extends in a first direction; and the supporting back film according to any one of the above, where the supporting back film is provided on a back side of the flexible display panel.

In some embodiments of the present disclosure, the flexible display device further includes:
- a polarizer, located on a display side of the flexible display panel;
- a flexible cover plate, located on a side of the polarizer away from the flexible display panel, and bonded to the polarizer through an optical adhesive;
- a protective film, located between the supporting back film and the flexible display panel; and
- a foam glue, bonded between the protective film and the supporting back film.

According to a third aspect of the present disclosure, there is provided a manufacturing method for a supporting back film, where, the supporting back film is provided on one side of a flexible display panel, the flexible display panel is provided with a bendable area, and a bending axis corresponding to the bendable area extends in a first direction, where, the manufacturing method includes:
- providing a substrate;
- forming a first supporting structure by performing a patterning process on the substrate, where an orthographic projection of the first supporting structure on the flexible display panel covers the bendable area, and the first supporting structure is bendable;
- forming a second supporting structure on at least one side of the first supporting structure in a second direction;
- where a volume of the second supporting structure is greater than or equal to a volume of the first supporting structure, and a density of the second supporting structure is less than a density of the first supporting structure; or
- a volume of the first supporting structure is greater than or equal to a volume of the second supporting structure, and a density of the first supporting structure is less than a density of the second supporting structure.

In some embodiments of the present disclosure, a material of the first supporting structure includes a metal material, the first supporting structure includes a main body part and a plug-in part located on at least one side of the main body part in the second direction, an orthographic projection of the main body part on the flexible display panel covers the bendable area, and the plug-in part includes at least one plug-in block;
- where, forming the second supporting structure on at least one side of the first supporting structure in the second direction includes:
- forming an injection cavity surrounded by the main body part, the plug-in block and a cavity wall of a molding cavity, through putting the first supporting structure into the molding cavity of an injection mold;
- forming the second supporting structure by injecting a high molecular polymer material into the injection cavity.

In some embodiments of the present disclosure, the patterning process includes at least one of an etching process and a laser cutting process.

Other features and advantages of the present disclosure will become apparent from the following detailed description, or be learned in part by practice of the present disclosure.

It is to be understood that the foregoing general description and the following detailed description are exemplary and explanatory and are not restrictive of the present disclosure.

BRIEF DESCRIPTION OF THE DRAWINGS

The accompanying drawings, which are incorporated in and constitute a part of this specification, illustrate embodiments consistent with the disclosure and together with the description serve to explain the principles of the disclosure. Obviously, the drawings in the following description are some embodiments of the present disclosure, and for those of ordinary skills in the art, other drawings can also be obtained from these drawings without creative effort.

DETAILED DESCRIPTION

Figure 1:
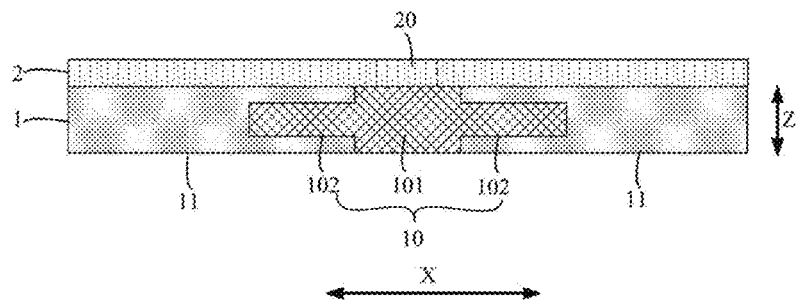
FIG. 1 shows a schematic diagram of the positional relationship between the supporting back film and the flexible display panel according to an embodiment of the present disclosure.

Example embodiments will now be described more fully with reference to the accompanying drawings. Example embodiments, however, can be embodied in various forms and should not be construed as limited to the embodiments set forth herein; by contrast, these embodiments are provided so that the present disclosure will be thorough and complete, and will fully convey the concept of example embodiments to those skilled in the art. The same reference numerals in the drawings denote the same or similar structures, and thus their detailed descriptions will be omitted.

Although relative terms such as "upper" and "lower" are used in the description to describe the relative relationship of one component of an icon to another component, these terms are used in the description for convenience, such as according to the direction of the example described in the drawings. It will be appreciated that if the device of the icon is turned upside down, the components described as "on" will become the components on "bottom". When a certain structure is "on" other structures, it may mean that a certain structure is integrally formed on other structures, or that a certain structure is "directly" arranged on other structures, or that a certain structure is "indirectly" arranged on another structure through other structures.

The terms "a", "an", "the", "said" and "at least one" are used to indicate the presence of one or more elements/components/etc.; the terms "include" and "have" are used to indicate an open-ended inclusion and means that there may be additional elements/components/etc. in addition to the listed elements/components/etc.

Figure 2:
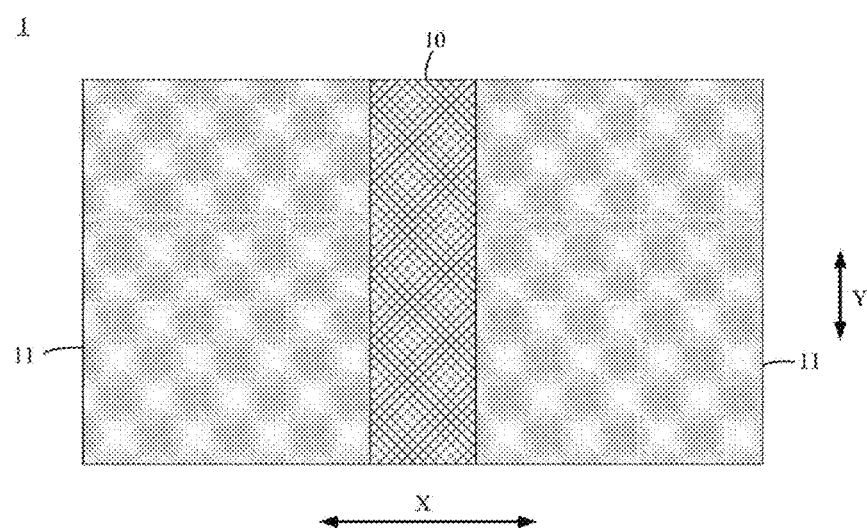
FIG. 2 shows a schematic plan view of the supporting back film according to an embodiment of the present disclosure.

With reference to FIG. 1 and FIG. 2, an embodiment of the present disclosure provides a supporting back film 1, which can be applied to a flexible display panel 2. The flexible display panel 2 includes a bendable area 20, and the bending axis corresponding to the bendable area 20 of the flexible display panel 2 extends in the first direction Y. The supporting back film 1 can be provided on the back side of the flexible display panel 2 to provide a certain support for the flexible display panel 2, thereby improving the flatness of the flexible display panel 2 and enhancing the impact resistance and bending resistance of the flexible display panel 2. It should be noted that the back side of the flexible display panel 2 refers to the side of the flexible display panel 2 opposite to its display side.

As shown in FIG. 1 and FIG. 2, the supporting back film 1 of some embodiments of the present disclosure may include a first supporting structure 10 and a second supporting structure 11 provided on at least one side of the first supporting structure 10 in the second direction X. The second direction X intersects with the first direction Y It should be noted that the first direction Y and the second direction X are both perpendicular to the thickness direction Z of the supporting back film 1.

Among them, the orthographic projection of the first supporting structure 10 of the supporting the back film 1 on the flexible display panel 2 can cover the bendable area 20 of the flexible display panel 2. That is, the orthographic projection of the bendable area 20 of the flexible display panel 2 on the reference plane can be located in the orthographic projection of the first supporting structure 10 on the reference plane, which is a plane perpendicular to the thickness direction Z of the supporting back film 1.

It should be understood that the first supporting structure 10 of the supporting back film 1 can be bent. That is to say, when the bendable area 20 of the flexible display panel 2 is bent or folded, the first supporting structure 10 can follow the bendable area 20 of the flexible display panel 2 to be bent or folded together.

In some embodiments of the present disclosure, if the volume of one of the first supporting structure 10 and the second supporting structure 11 is larger than that of the other, the density of the supporting part with the larger volume can be designed to be less than the density of the supporting part with the smaller volume. That is to say, the supporting back film 1 may be composed of at least two supporting structures with different densities. It is understood that, in order to make the density of the first supporting structure 10 and the density of the second supporting structure 11 of the supporting back film 1 be different from each other, the first supporting structure 10 and the second supporting structure 11 of some embodiments of the present disclosure can be made of materials with different densities respectively. That is, the supporting back film 1 of some embodiments of the present disclosure can be composed of different materials. Compared with the supporting back film 1 made of a single material, in some embodiments of the present disclosure the materials of different regions of the supporting back film 1 can be adjusted according to the different requirements for the supporting performance and bending performance of different regions of the product, so as to ensure the bending performance of the supporting back film 1, while ensuring and the support flatness.

Further, while ensuring the bending performance and the support flatness of the supporting back film 1, a material with a lower density may be chosen for the supporting structure with a larger volume in the supporting back film 1 and a material with a higher density may be chosen for the supporting structure with a smaller volume to reduce the weight of the supporting back film 1, which can be beneficial to reduce the weight of the product and expand its application range.

It should be noted that when the volume of the second supporting structure 11 in the supporting back film 1 is equal to the volume of the first supporting structure 10, the density of the second supporting structure 11 may be less than the density of the first supporting structure 10, but not limited to this, can also be greater than the density of the first supporting structure 10, as long as the weight of the supporting backing film 1 can be reduced while ensuring the bending performance and the support flatness of the supporting backing film 1.

In addition, it should be noted that the structure of the supporting back film 1, the structure of the flexible display panel 2, and the positional relationship between the two described in the present disclosure are all designed, unless otherwise specified, when the supporting back film 1 and flexible display panel 2 are in a flattened state (i.e., in an unbent or folded state).

The structure of the supporting back film 1 according to some embodiments of the present disclosure will be described in detail below with reference to the accompanying drawings.

As shown in FIG. 1 and FIG. 2, the first supporting structure 10 of the supporting back film 1 is provided with a second supporting structure 11 on opposite sides in the second direction X, and the second direction X is perpendicular to the first direction Y, in order to reduce the design difficulty.

In some embodiments of the present disclosure, the volume of the second supporting structure 11 in the supporting back film 1 is larger than that of the first supporting structure 10. To reduce the weight of the supporting back film 1, the density of the second supporting structure 11 can be designed to be smaller than that of the first supporting structure 10.

Further, the stiffness of the second supporting structure 11 may be greater than or equal to the stiffness of the first supporting structure 10, which can ensure the support performance of the second supporting structure 11 and improve the support flatness, while ensuring the bending performance of the first supporting structure 10. It should be noted that the stiffness of the second supporting structure 11 may also be slightly smaller than the stiffness of the first supporting structure 10, as long as the support requirements of the entire supporting back film 1 can be guaranteed.

In some embodiments of the present disclosure, the material of the first supporting structure 10 may include a metal material; for example, the metal material may include stainless steel; but not limited to this, it may also be other materials with good support performance and bending performance, depending on the specific situation. The material of the second supporting structure 11 can be a high molecular polymer material; for example, the high molecular polymer material can include polycarbonate (abbreviation: PC) or polymethyl methacrylate (abbreviation: PMMA) with good stiffness); but not limited to this, it can also be other materials with good support performance, depending on the specific situation.

Among them, the first supporting structure 10 in some embodiments of the present disclosure is made of stainless steel, and the second supporting structure 11 is supported by PC material or PMMA material, so compared with the supporting back film 1 made of stainless steel as a whole, which can reduce the weight by about 80% by a reasonable design, while the production cost will be greatly reduced.

As shown in FIG. 1, the first supporting structure 10 in the supporting back film 1 of some embodiments of the present disclosure may include a main body part 101 and a plug-in part located on opposite sides of the main body part 101 in the second direction X. The orthographic projection of the main body part 101 on the flexible display panel 2 covers the bendable area 20 of the flexible display panel 2. That is, the orthographic projection of the bendable area 20 of the flexible display panel 2 on the reference plane is located within the orthographic projection of the main body part 101 on the reference plane. The plug-in part includes at least one plug-in block 102, and the plug-in block 102 can be fitted in the second supporting structure 11. That is, the first supporting structure 10 can be connected with the second supporting structure 10 through its own plug-in block 102, which can ensure the connection stability of the first supporting structure 10 and the second supporting structure 11, thereby ensuring the structural stability of the supporting back film 1.

Figure 3:
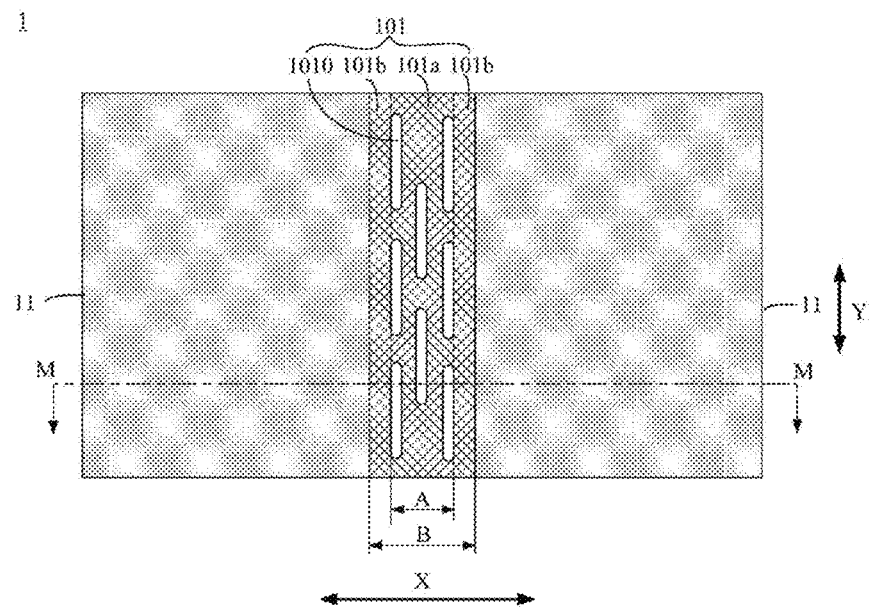
FIG. 3 shows a schematic plan view of the supporting back film according to another embodiment of the present disclosure.

As shown in FIG. 3, the main body part 101 of the first supporting structure 10 may have a hollow pattern area 101a, and the orthographic projection of the hollow pattern area 101a on the flexible display panel 2 may cover the bendable area 20 of the flexible display panel 2, namely: the orthographic projection of the bendable area 20 of the flexible display panel 2 on the reference plane can be located within the orthographic projection of the hollow pattern area 101a on the reference plane. It should be noted that the hollow pattern area 101a is the area of the main body part 101 provided with the hollow holes 1010.

In some embodiments of the present disclosure, by setting the area in the main body part 101 of the first supporting structure 10 corresponding to the bendable area 20 of the flexible display panel 2 as the hollow pattern area 101a, the bending performance thereof can be improved, so as to facilitate to match with the requirement of a smaller bending radius and expend the applicable scope of the supporting back film 1.

For example, the hollow holes 1010 of the hollow pattern area 101a mentioned above can be oblong holes extending in the first direction Y. As shown in FIG. 3, the oblong hole refers to a hole with a rectangular center and a semicircular end, which facilitates bending and deformation of the main body part 101 of the first supporting structure 10 and reduces stress concentration on a single patterned boundary (i.e., the boundary of a hollow hole 1010).

Among them, the hollow holes 1010 in the hollow pattern area 101a can be provided with a plurality and arranged in an array. Further, as shown in FIG. 3, the adjacent hollow hole 1010 in the second direction X can be staggered, which is convenient to distribute the stress more evenly during the bending process, thereby improving the stability of the first supporting structure 10.

It should be noted that, the hollow holes 1010 in the hollow pattern area 101a are not limited to oblong holes, and may also be holes of other shapes, depending on the specific situation; and the arrangement of the hollow holes 1010 in the hollow pattern area 101a is not limited to the above-mentioned content, as long as being able to ensure the structural stability and good bendability of the hollow pattern area 101a.

In some embodiments of the present disclosure, the main body part 101 further has non-pattern areas 101b located on opposite sides of the hollow pattern area 101a in the second direction X, and the non-pattern areas 101b are areas of the main body part 101 that have not been patterned, that is, areas with no patterns such as through holes, grooves, and notches. The transition between the hollow pattern area 101a and the plug-in part can be realized by providing the non-pattern areas 101b to ensure the stability of the first supporting structure 10.

Figure 4:
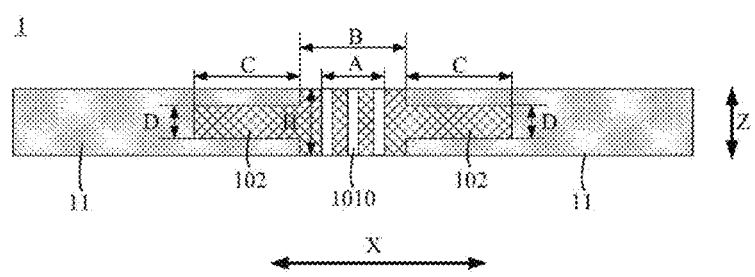
FIG. 4 shows a schematic cross-sectional view of the supporting back film shown in FIG. 3 in the M-M direction.

It should be understood that, in order to ensure that the supporting back film 1 can meet the bending performance and flatness of the product, and it can also reduce the weight of the supporting back film 1, the shape and size of the first supporting structure 10 of the supporting back film 1 are reasonably designed. Specifically, when the bending radius corresponding to the bendable area 20 of the flexible display panel 2 to be supported by the supporting back film 1 is R, as shown in FIG. 3 and FIG. 4, the dimension of the main body part 101 in the first supporting structure 10 of the supporting the back film 1 in the second direction X may be B, and the dimension of the hollow pattern area 101a of the main body part 101 in the second direction X may be A; where, the relationship between A, B, and R may be: $A-2\times\pi\times R=P$, and $B-A=Q$; the value range of P is 10 mm to 20 mm, such as: 10 mm, 12 mm, 14 mm, 16 mm, 18 mm, 20 mm, etc.; the value range of Q is 5 mm to 10 mm, such as: 5 mm, 6 mm, 7 mm, 8 mm, 9 mm, 10 mm, etc., which can ensure the bending performance of the supporting backing film 1 and the structural stability of the supporting backing film 1.

It should be noted that the dimensions of the non-pattern areas 101b located on both sides of the hollow pattern area 101a in the second direction X may be equal. That is to say, when the aforementioned value of Q ranges from 5 mm to 10 mm, the dimension of the non-pattern areas 101b in the second direction X may be 2.5 mm to 5 mm, such as: 2.5 mm, 3 mm, 3.5 mm, 4 mm, 4.5 mm, 5 mm and so on.

In some embodiments of the present disclosure, in order to further ensure the connection stability between the first supporting structure 10 and the second supporting structure 11, the dimension of the plug-in block 102 in the second direction X can be designed as C, where the ratio between C and the aforementioned A is 1 to 2. That is, the ratio of the dimension of the plug-in block 102 in the second direction X to the dimension of the hollow pattern area 101a of the main body part 101 in the second direction X is 1 to 2, for example: 1, 1.2, 1.4, 1.6, 1.8, 2, etc.

In addition, the ratio of the thickness D of the plug-in block 102 to the thickness H of the main body part 101 may be greater than or equal to 0.5 and less than 1. That is, the thickness D of the plug-in block 102 may be smaller than the thickness H of the main body part 101 and greater than or equal to a half of the thickness of the main body part 101, so as to ensure the stability of the connection between the first supporting structure 10 and the second supporting structure 11, and also to reduce the weight of the entire supporting back film 1.

For example, the thickness H of the main body part 101 may be 100 μm to 200 μm, such as: 100 μm, 120 μm, 140 μm, 160 μm, 180 μm, 200 μm, etc. It should be understood that when the thickness H of the main body part 101 is within this range, the thickness D of the plug-in block 102 can be adjusted according to the actual situation, as long as the thickness D is smaller than the thickness H of the main body part 101 and greater than or equal to a half of the thickness of the main body part 101. It should be noted that the thickness of the main body part 101 is the thickness of the entire supporting back film 1.

In some embodiments of the present disclosure, the side of the first supporting structure 10 and the second supporting structure 11 close to the flexible display panel 2 can be defined as the top side, the side of the first supporting structure 10 and the second supporting structure 11 far away from the flexible display panel 2 can be defined as the bottom side, where, when the thickness D of the plug-in block 102 is smaller than the thickness H of the main body part 101, at least one of the top side and the bottom side of the first supporting structure 10 may be stepped. In addition, It should also be noted that the top side of the second supporting structure 11 may be flush with the top side of the main body part 101, and the bottom side of the second supporting structure 11 may be flush with the bottom side of the main body part 101.

Optionally, as shown in FIG. 4, the top side and the bottom side of the first supporting structure 10 are both stepped. In other words, the opposite sides of the plug-in block 102 in the thickness direction Z are retracted inwardly relative to the opposite sides of the main body part 101 in the thickness direction Z, so that the contact area between the second supporting structure 11 and the first supporting structure 10 can be increased, and the connection stability of the first supporting structure 10 and the second supporting structure 11 can be increased.

Further, the distance between the top side of the plug-in block 102 and the top side of the main body part 101 is equal to the distance between the bottom side of the plug-in block 102 and the bottom side of the main body part 101, which makes the opposite sides of the plug-in block 102 in the thickness direction Z are substantially the same as the contact area of the second supporting part, so as to further ensure the connection stability between the first supporting structure 10 and the second supporting structure 11.

It should be noted that the top side of the plug-in block 102 and the top side of the main body part 101 belong to a part of the top side of the entire first supporting structure 10, and the bottom side of the plug-in block 102 and the bottom side of the main body part 101 belong to a part of the bottom side the entire first supporting structure 10.

Figure 5:
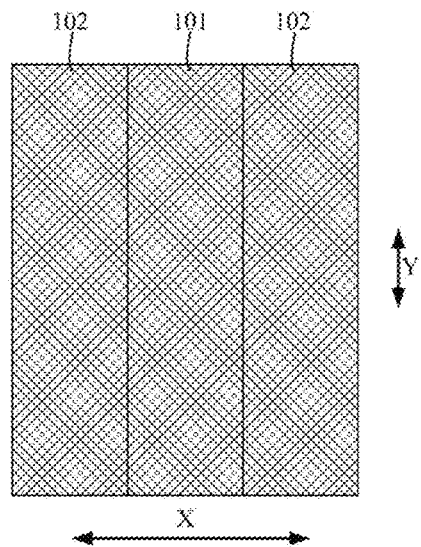
FIGS. 5 to 7 respectively show schematic plan views of the first supporting structure according to different embodiments of the present disclosure.
Figure 6:
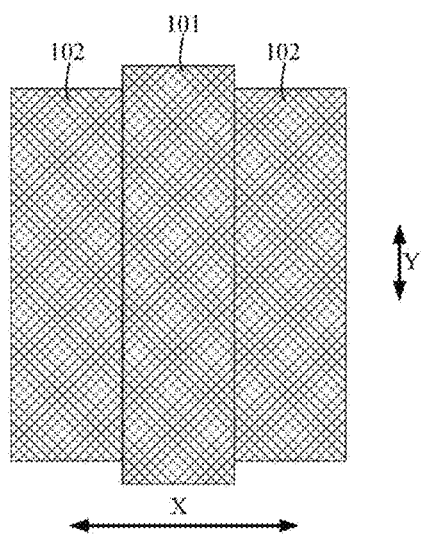

In some embodiments, as shown in FIG. 5, the plug-in part may include one plug-in block 102. That is, the shape and dimension of the plug-in block 102 are the shape and dimension of the entire plug-in part. In this case, the opposite sides of the plug-in block 102 in the first direction Y can be flushed with the opposite sides of the main body part 101 in the first direction Y respectively, so as to reduce the design difficulty while ensuring the connection stability between the first supporting structure 10 and the second supporting structure 11. But it is not limited to this, and the opposite sides of the plug-in block 102 in the first direction Y may also be retracted inwardly relative to the opposite sides of the main body part in the first direction Y, as shown in FIG. 6.

Figure 7:
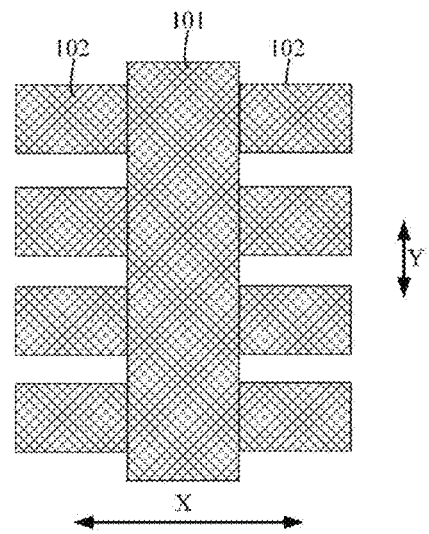

In some embodiments, as shown in FIG. 7, the plug-in part may include a plurality of plug-in blocks 102 arranged at intervals in the first direction Y, and such design can increase the contact area of the first supporting structure 10 and the second supporting structure 11, thus ensuring the stability of the connection between the first supporting structure 10 and the second supporting structure 11.

It should be noted that the first supporting structure 10 in some embodiments of the present disclosure is an integrated structure to ensure its structural stability.

Some embodiments of the present disclosure further provide a method for manufacturing the supporting back film 1, which is used to manufacture the structure of the supporting back film 1 described in any of the foregoing embodiments, which will not be repeated here. Among them, the manufacturing method for the supporting back film 1 may include:

Step S100, a substrate is provided;

Step S200, a first supporting structure 10 is formed by performing a patterning process on the substrate, the orthographic projection of the first supporting structure 10 on the flexible display panel 2 covers the bendable area 20, and the first supporting structure 10 is bendable;

Step S300, a second supporting structure 11 is formed on at least one side of the first supporting structure 10 in the second direction X.

Among them, the volume of the second supporting structure 11 is greater than or equal to the volume of the first supporting structure 10, and the density of the second supporting structure 11 is less than the density of the first supporting structure 10. Or, the volume of the first supporting structure 10 is greater than or equal to the second supporting structure 11, and the density of the first supporting structure 10 is less than the density of the second supporting structure 11.

When the material of the first supporting structure 10 is a metal material, and the first supporting structure 10 includes a main body part 101 and a plug-in part located on at least one side of the main body part 101 in the second direction X, the details may be referred to the foregoing description, and not repeated here. Step S300 may include:

Step S302, the first supporting structure 10 is put into the molding cavity of the injection mold, and an injection cavity surrounded by the main body part 101, the plug-in block 102 and the cavity wall of the molding cavity is formed;

Step S304, the second supporting structure 11 is formed by injecting high molecular polymer material into the injection cavity.

That is to say, when the first supporting structure 10 of the supporting back film 1 is made of metal material and the second supporting structure 11 is made of high molecular polymer material, the first supporting structure 10 and the second supporting structure 11 can be formed by injection molding together to form the entire supporting backing film 1. However, it should be noted that the first supporting structure 10 and the second supporting structure 11 are not limited to being connected together by injection molding, and may also be connected together by other methods, such as gluing, depending on the specific situation.

For example, the patterning process mentioned in step S200 may include at least one of an etching process and a laser cutting process, but is not limited this, and may also include other processes, depending on specific circumstances.

Figure 8:
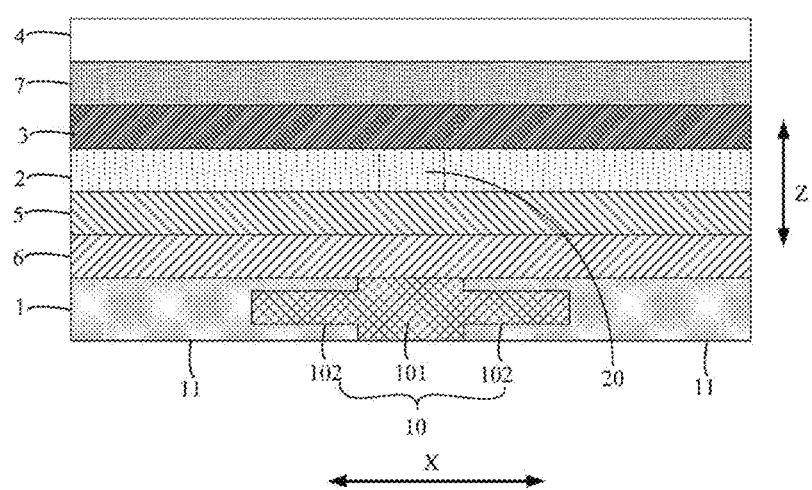
FIG. 8 shows a schematic structural diagram of the flexible display device according to an embodiment of the present disclosure.

An embodiment of the present disclosure further provides a flexible display device, as shown in FIG. 8, which includes a flexible display panel 2 and the supporting back film 1 described in any of the foregoing embodiments, and the specific structure of the supporting back film 1 is not described herein again. Among them, the flexible display panel 2 has a bendable area 20, and the bending axis corresponding to the bendable area 20 extends in the first direction Y; the supporting back film 1 is provided on the backside of the flexible display panel 2.

For example, the flexible display panel 2 of some embodiments of the present disclosure may be an OLED (Organic Light-Emitting Diode) display, but is not limited this, and may also be other types of display, depending on the specific situation.

Optionally, as shown in FIG. 8, the flexible display device further includes a polarizer 3, a flexible cover plate 4, a protective film 5 and a foam glue 6. Among them, the polarizer 3 can be located on the display side of the flexible display panel 2. When the flexible display panel 2 is an OLED display, the polarizer 3 can be a circular polarizer to reduce reflection. The flexible cover plate 4 can be located on the side of the polarizer 3 away from the flexible display panel 2, and can be bonded to the polarizer 3 through the optical adhesive 7 (referred to as OCA). The flexible cover plate 4 can be a transparent polyimide (abbreviation: CPI) material. The protective film 5 can be located between the supporting back film 1 and the flexible display panel 2, and is used for protecting the flexible display panel 2. For example, the protective film 5 can be a paint surface protective film 5; the foam glue 6 can be bonded between the protective film 5 and the supporting back film 1 to play a buffering role.

The flexible display device of some embodiments of the present disclosure can be a foldable product, which can be folded inward; that is, the display side of the product is located on the inside of the fold. Or, it can be folded outward; that is, the display side of the product is located outside the fold.

In some embodiments of the present disclosure, the specific type of the flexible display device is not particularly limited, and any type of flexible display device commonly used in the art can be used, such as an OLED display, a mobile phone, a tablet computer, a watch, a VR device, and the like. Those skilled in the art can make corresponding selections according to the specific use of the display device, which will not be repeated here. It should be noted that, in addition to the aforementioned structures, the flexible display device also includes other necessary components and composition, taking a display as an example, such as a casing, a circuit board, a power cord, etc. Those skilled in the art can make corresponding supplementation according to specific usage requirements of the display device, and details are not repeated here.

Those skilled in the art will easily think of other embodiments of the present disclosure after considering the description and practicing the contents disclosed here. The present disclosure is intended to cover any variation, use or adaptive change of the present disclosure, which follows the general principles of the present disclosure and includes the common knowledge or customary technical means in the technical field not disclosed in the present disclosure. The description and the embodiments are considered as exemplary, and the true scope and spirit of the present disclosure are indicated by the appended claims.

What is claimed is:

1. A supporting back film, provided on a back side of a flexible display panel, wherein, the flexible display panel is provided with a bendable area, and a bending axis corresponding to the bendable area extends in a first direction, wherein:
   the supporting back film comprises a first supporting structure and a second supporting structure provided on at least one side of the first supporting structure in a second direction; the second direction intersects with the first direction; an orthographic projection of the first supporting structure on the flexible display panel covers the bendable area, and the first supporting structure is bendable; wherein,
   a volume of the second supporting structure is greater than or equal to a volume of the first supporting structure, and a density of the second supporting structure is less than a density of the first supporting structure; or
   a volume of the first supporting structure is greater than or equal to a volume of the second supporting structure, and a density of the first supporting structure is less than a density of the second supporting structure;
   wherein the first supporting structure comprises a main body part and a plug-in part located on opposite sides of the main body part in the second direction; an orthographic projection of the main body part on the flexible display panel covers the bendable region; the plug-in part comprises at least one plug-in block, and the plug-in block is fitted in the second supporting structure.

2. The supporting back film according to claim 1, wherein,
   the second supporting structure is provided on opposite sides of the first supporting structure in the second direction, and the second direction is perpendicular to the first direction;
   wherein, the volume of the second supporting structure is greater than the volume of the first supporting structure, and the density of the second supporting structure is less than the density of the first supporting structure.

3. The supporting back film according to claim 2, wherein a stiffness of the second supporting structure is greater than or equal to a stiffness of the first supporting structure.

4. The supporting back film according to claim 1, wherein,
   the main body part is provided with a hollow pattern area and a non-pattern area located on opposite sides of the hollow pattern area in the second direction, and an orthographic projection of the hollow pattern area on the flexible display panel covers the bendable region.

5. The supporting back film according to claim 4, wherein,
   a dimension of the hollow pattern area in the second direction is A, a dimension of the main body part in the second direction is B, and a bending radius corresponding to the bendable area of the flexible display panel is R;
   wherein, $A-2\times\pi\times R=P$, and $B-A=Q$; a value range of P is 10 mm to 20 mm, and a value range of Q is 5 mm to 10 mm.

6. The supporting back film according to claim 5, wherein,
   a dimension of the plug-in block in the second direction is C, wherein a ratio of C to A is 1 to 2.

7. The supporting back film according to claim 1, wherein a ratio of a thickness of the plug-in block to a thickness of the main body part is greater than or equal to 0.5 and less than 1.

8. The supporting back film according to claim 7, wherein a side of the first supporting structure close to the flexible display panel is a top side, and a side away from the flexible display panel is a bottom side;
   wherein, a distance between a top side of the plug-in block and a top side of the main body part is equal to a distance between a bottom side of the plug-in block and a bottom side of the main body part.

9. The supporting back film according to claim 8, wherein,
   the plug-in part comprises one plug-in block, and opposite sides of the plug-in block in the first direction are flush with opposite sides of the main body part in the first direction respectively.

10. The supporting back film according to claim 7, wherein a thickness of the main body part is 100 µm to 200 µm.

11. The supporting back film according to claim 1, wherein a material of the first supporting structure comprises a metal material, and a material of the second supporting structure comprises a high molecular polymer material.

12. The supporting back film according to claim 11, wherein the metal material comprises stainless steel, and the high molecular polymer material comprises polycarbonate or polymethyl methacrylate.

13. A flexible display device, comprising:
   a flexible display panel, wherein the flexible display panel is provided with a bendable area, and a bending axis corresponding to the bendable area extends in a first direction; and
   a supporting back film provided on a back side of the flexible display panel, wherein:
   the supporting back film comprises a first supporting structure and a second supporting structure provided on at least one side of the first supporting structure in a second direction; the second direction intersects with the first direction; an orthographic projection of the first supporting structure on the flexible display panel covers the bendable area, and the first supporting structure is bendable; wherein,
   a volume of the second supporting structure is greater than or equal to a volume of the first supporting structure, and a density of the second supporting structure is less than a density of the first supporting structure; or
   a volume of the first supporting structure is greater than or equal to a volume of the second supporting structure, and a density of the first supporting structure is less than a density of the second supporting structure;
   wherein the first supporting structure comprises a main body part and a plug-in part located on opposite sides of the main body part in the second direction: an orthographic projection of the main body part on the flexible display panel covers the bendable region; the plug-in part comprises at least one plug-in block, and the plug-in block is fitted in the second supporting structure.

14. The flexible display device according to claim 13, further comprising:
   a polarizer, located on a display side of the flexible display panel;
   a flexible cover plate, located on a side of the polarizer away from the flexible display panel, and bonded to the polarizer through an optical adhesive;
   a protective film, located between the supporting back film and the flexible display panel; and
   a foam glue, bonded between the protective film and the supporting back film.

15. A manufacturing method for a supporting back film, wherein, the supporting back film is provided on one side of a flexible display panel, the flexible display panel is provided with a bendable area, and a bending axis corresponding to the bendable area extends in a first direction, wherein, the manufacturing method comprises:
   providing a substrate;
   forming a first supporting structure by performing a patterning process on the substrate, wherein an orthographic projection of the first supporting structure on the flexible display panel covers the bendable area, and the first supporting structure is bendable; and
   forming a second supporting structure on at least one side of the first supporting structure in a second direction, wherein the second direction intersects with the first direction;
   wherein a volume of the second supporting structure is greater than or equal to a volume of the first supporting structure, and a density of the second supporting structure is less than a density of the first supporting structure; or
   a volume of the first supporting structure is greater than or equal to a volume of the second supporting structure, and a density of the first supporting structure is less than a density of the second supporting structure;
   wherein, a material of the first supporting structure comprises a metal material, the first supporting structure comprises a main body part and a plug-in part located on at least one side of the main body part in the second direction, an orthographic projection of the main body part on the flexible display panel covers the bendable area, and the plug-in part comprises at least one plug-in block;
   wherein, forming the second supporting structure on at least one side of the first supporting structure in the second direction comprises:
   forming an injection cavity surrounded by the main body part, the plug-in block and a cavity wall of a molding cavity, through putting the first supporting structure into the molding cavity of an injection mold; and
   forming the second supporting structure by injecting a high molecular polymer material into the injection cavity.

16. The manufacturing method according to claim 15, wherein the patterning process comprises at least one of an etching process and a laser cutting process.

17. The supporting back film according to claim 8, wherein,
   the plug-in part comprises a plurality of plug-in blocks arranged at intervals in the first direction.

18. The flexible display device according to claim 13, wherein a material of the first supporting structure comprises a metal material, and a material of the second supporting structure comprises a high molecular polymer material.

* * * * *